United States Patent
MacAulay et al.

(10) Patent No.: US 9,536,096 B2
(45) Date of Patent: *Jan. 3, 2017

(54) PRESENTING VISUALIZATIONS OF BUSINESS INTELLIGENCE DATA

(71) Applicant: Business Objects Software Ltd., Dublin (IE)

(72) Inventors: Alex MacAulay, Vancouver (CA); Satishkumar Sekharan, Vancouver (CA); Yuru Wang, Coquitlam (CA)

(73) Assignee: Business Objects Software Ltd., Dublin (IE)

( * ) Notice: Subject to any disclaimer, the term of this patent is extended or adjusted under 35 U.S.C. 154(b) by 777 days.

This patent is subject to a terminal disclaimer.

(21) Appl. No.: 13/716,500

(22) Filed: Dec. 17, 2012

(65) Prior Publication Data

US 2014/0173412 A1   Jun. 19, 2014

(51) Int. Cl.
| | |
|---|---|
| *G06F 17/00* | (2006.01) |
| *G06F 21/60* | (2013.01) |
| *G06F 17/22* | (2006.01) |
| *G06F 21/62* | (2013.01) |
| *G06F 17/21* | (2006.01) |

(52) U.S. Cl.
CPC ............ *G06F 21/60* (2013.01); *G06F 17/21* (2013.01); *G06F 17/2264* (2013.01); *G06F 21/6209* (2013.01)

(58) Field of Classification Search
CPC ...... G06F 17/2264; G06F 17/21; G06F 21/60; G06F 21/6209
USPC ................................................. 715/234, 239
See application file for complete search history.

(56) References Cited

U.S. PATENT DOCUMENTS

| | | | |
|---|---|---|---|
| 7,302,118 B2 | 11/2007 | Liu et al. | |
| 7,668,868 B1* | 2/2010 | King | G06F 17/30011 |
| | | | 707/609 |
| 8,688,703 B1 | 4/2014 | Antova et al. | |
| 8,799,305 B2* | 8/2014 | Young, Jr. | G06F 17/3089 |
| | | | 707/758 |
| 8,924,842 B2* | 12/2014 | Heiney | G06F 17/30011 |
| | | | 715/212 |
| 9,229,995 B2 | 1/2016 | Sekharan | |
| 2002/0033844 A1 | 3/2002 | Levy et al. | |
| 2003/0147563 A1 | 8/2003 | Liu et al. | |
| 2008/0046239 A1 | 2/2008 | Boo | |
| 2011/0145693 A1* | 6/2011 | Mutic | G06F 19/321 |
| | | | 715/233 |
| 2011/0153611 A1 | 6/2011 | Ankisettipalli et al. | |

(Continued)

OTHER PUBLICATIONS

QlikView for SAP—Increasing the value of SAP with quick, flexible, ad-hoc analysis, Aug. 24, 2010, SAP Certified-Powered by SAP NetWeaver, pp. 4.*

(Continued)

*Primary Examiner* — Chau Nguyen
(74) *Attorney, Agent, or Firm* — Schwegman Lundberg & Woessner, P.A.

(57) ABSTRACT

A system and method for managing business intelligence data is described. In some example embodiments, the system extracts data and metadata from a business intelligence file, generates a data bundle of the data and metadata, generates an application bundle based on the date bundle, and generates an interactive document using the data bundle and application bundle.

20 Claims, 12 Drawing Sheets

(56) References Cited

U.S. PATENT DOCUMENTS

| | | | |
|---|---|---|---|
| 2011/0167173 A1 | 7/2011 | Bansal et al. | |
| 2012/0117089 A1* | 5/2012 | Matrat | G06F 17/30696 707/752 |
| 2012/0158643 A1* | 6/2012 | Mital | G06F 17/30539 707/600 |
| 2012/0166923 A1* | 6/2012 | Bhatt | G06F 17/30056 715/202 |
| 2013/0007794 A1 | 1/2013 | Besehanic et al. | |
| 2013/0013677 A1* | 1/2013 | Engstrom | H04L 67/2823 709/203 |
| 2013/0054284 A1* | 2/2013 | Burke | G06Q 10/00 705/7.11 |
| 2013/0191078 A1* | 7/2013 | Batra | G06F 17/5095 703/1 |
| 2013/0211555 A1 | 8/2013 | Lawson et al. | |
| 2014/0002504 A1* | 1/2014 | Farmer | G09G 5/00 345/660 |
| 2014/0172885 A1 | 6/2014 | Sekharan | |
| 2014/0173411 A1 | 6/2014 | Sekharan | |
| 2014/0258927 A1* | 9/2014 | Rana | G06F 17/30265 715/810 |
| 2016/0072866 A1* | 3/2016 | Voss | G06F 17/30516 709/219 |

OTHER PUBLICATIONS

SAP BusinessObjects Desktop Intelligence Access and Analysis Guide, May 24, 2010, SAP AG, Sap NetWeaver, pp. 1-364.*

Yu et al., "Hierarchical Streamline Bundles for Visualizing 2D Flow Fields", Dec. 6, 2010, Michigan Technological University, www.cs.mtu.edu/~chaoliw/research/vis10-hsb.pdf, pp. 2.*

Dayal et al., "Data Integration Flows for Business Intelligence", EDBT'09, Mar. 24-26, 2009, Saint Petersburg, Russia, Copyright 2009 ACM, pp. 11.*

"U.S. Appl. No. 13/716,449, Examiner Interview Summary mailed Dec. 24, 2014", 3 pgs.

"U.S. Appl. No. 13/716,449, Final Office Action mailed Apr. 1, 2015", 13 pgs.

"U.S. Appl. No. 13/716,449, Non Final Office Action mailed Aug. 29, 2014", 12 pgs.

"U.S. Appl. No. 13/716,449, Response filed Jan. 22, 2015 to Non Final Office Action mailed Aug. 29, 2014", 10 pgs.

"U.S. Appl. No. 13/716,471, Restriction Requirement mailed Jun. 4, 2015", 5 pgs.

Singh, "Visual Intelligence: The Next Generation of Understanding", [Online]. Retrieved from Internet: <http://events.asug.com/2012BOUC/1303 Visual Intelligence The Next Generation of Understanding.pdf>, (Sep. 10-13), 13 pgs.

"U.S. Appl. No. 13/716,449, Non Final Office Action mailed Aug. 20, 2015", 13 pgs.

"U.S. Appl. No. 13/716,449, Notice of Allowance mailed Nov. 9, 2015", 11 pgs.

"U.S. Appl. No. 13/716,449, Response filed Aug. 3, 2015 to Final Office Action mailed Apr. 1, 2015", 13 pgs.

"U.S. Appl. No. 13/716,449, Response filed Oct. 14, 2015 to Non Final Office Action mailed Aug. 10, 2015", 11 pgs.

"U.S. Appl. No. 13/716,471, Non Final Office Action mailed Nov. 6, 2015", 16 pgs.

"U.S. Appl. No. 13/716,471, Response filed Aug. 3, 2015 to Restriction Requirement mailed Jun. 4, 2015", 8 pgs.

"U.S. Appl. No. 13/716,471, Response filed Jan. 28, 2016 to Non Final Office Action mailed Nov. 6, 2015", 19 pgs.

U.S. Appl. No. 13/716,449, filed Dec. 17, 2012, Extracting Data From Business Intelligence Files.

U.S. Appl. No. 13/716,471, filed Dec. 17, 2012, Packaging Business Intelligence Documents With Embedded Data.

* cited by examiner

PRESENTING VISUALIZATIONS OF BUSINESS INTELLIGENCE DATA

TECHNICAL FIELD

The subject matter disclosed herein generally relates to the processing of data and, more specifically, to managing and/or presenting visualizations of business intelligence data.

BACKGROUND

Business intelligence (BI) involves the collecting, maintaining, and organizing of information for an enterprise, such as for a company. An enterprise produces vast amounts of information, and uses a BI system to analyze the data, produce documents using the data, and so on. For example, a typical BI system may communicate with a data store of BI data in order to generate documents using BI data, such as charts, graphs, and so on.

The document could be a BI document, a report, a dashboard, and so on. The term report may refer to a document including information automatically retrieved (i.e., in response to computer executable instructions) from a data source (e.g., a database, a data warehouse, semi-structured file, and so on), where the information is structured in accordance with a report schema, or specification, that specifies the form in which the information should be aggregated, filtered, presented, and so on. A dashboard is similar to a report, and often is a single page, showing a graphical presentation of current and past values of key measures of an enterprise, among other things.

BRIEF DESCRIPTION OF THE DRAWINGS

The present technology is illustrated by way of example, and not by way of limitation, in the figures of the accompanying drawings.

DETAILED DESCRIPTION

Overview

A system and method for managing business intelligence data are described. In some example embodiments, the system extracts data and metadata from a business intelligence file, generates a data bundle of the data and metadata, generates an application bundle based on the data bundle, and generates an interactive document using the data bundle and application bundle.

To extract data from a business intelligence file, such as an SAP Visual Intelligence Document file (SVID file), the system, in some example embodiments, identifies data components and metadata components contained within the file, extracts and converts the metadata into a format that may be consumed by a document preparation component, extracts and converts the data into a format that may be consumed by the document preparation component, and generates a data bundle that includes the converted metadata and the converted data.

To create rendering instructions to be utilized by the document preparation component, the system, in some example embodiments, receives the extracted and converted data and metadata, selects a charting library in which to provide rendering instructions based on the received data and metadata, generates the rendering instructions using the selected charting library, and generates an application bundle that includes the generated rendering instructions that are based on the received data and metadata.

To generate an interactive document, such as a business intelligence or visual intelligence document (e.g., interactive chart or graph), the system, in some example embodiments, receives the application bundle and the data bundle, encodes the received bundles based on a document viewer used to present generated documents, combines the data bundle with the application bundle, and generates an interactive document that is displayable by the document viewer (e.g., a browser or application running on a computing device, such as a laptop or tablet computer).

Thus, the system, in some example embodiments, creates a data bundle and application bundle that is based on the type of data or metadata associated with a business intelligence document, which facilitates any document viewer, either in online or offline mode, displaying single-page documents capable of being interacted with by a user of the documents, among other benefits.

In the following description, for purposes of explanation, numerous specific details are set forth to provide a thorough understanding of example embodiments. It will be evident to one skilled in the art, however, that the present subject matter may be practiced without these specific details.

Example System

Figure 1:
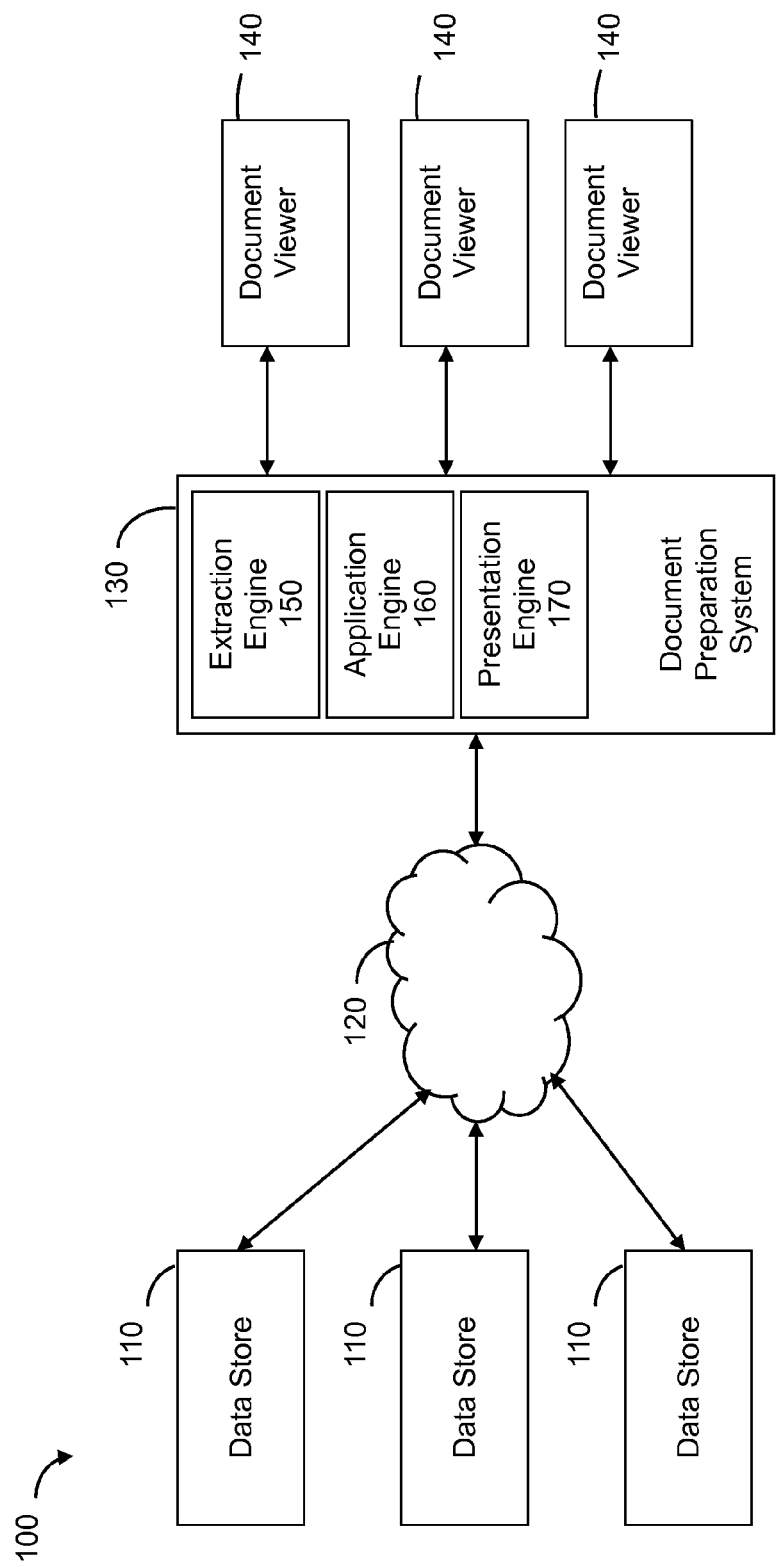
FIG. 1 is a network diagram illustrating a network environment for managing business intelligence data, in some example embodiments.

FIG. 1 is a network diagram illustrating a network environment 100 for managing business intelligence data, in some example embodiments. The network environment 100 may include data stores 110 that contain data, such as business intelligence (BI) data, a document preparation system 130 that communicates with the data stores 110 over a network 120, and document viewers 140 that display interactive documents generated by the document preparation system 130.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 12. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 120 may be any network that enables communication between or among machines, databases, and devices. Accordingly, the network 120 may be a wired network, a wireless network (e.g., a mobile or cellular network), a storage area network (SAN), or any suitable combination thereof. The network 120 may include one or more portions of a private network, a public network (e.g., the Internet), or any suitable combination thereof.

In some example embodiments, the data stores 110 contain files of data and metadata in various formats applicable to business intelligence data, such as the SAP Visual Intelligence Document (SVID) format. The data stores may also include various other types of file formats, such as spreadsheet-based data formats (e.g., XLS files), visualized data presentations (e.g., charts, graphs, and so on), structured data formats, semi-structured data formats, unstructured data formats, and so on.

In some example embodiments, the metadata includes information on the data that describes the data, how the business intelligence file makes use of the data, how the business intelligence file is formatted, and so on. In some example embodiments, the metadata is stored in Extensible Markup Language (XML) format.

In some example embodiments, the document viewers 140 are components configured to display or otherwise present documents, pages, or other visual content. The document viewers 140 may also facilitate navigation and other interactions with displayed documents. Example document viewers 140 may include web browsers (e.g., Firefox, Safari, Internet Explorer, Chrome, and so on), mobile browsers (microbrowsers, mobile HTML encoders, and so on), stand-alone viewing applications, and other components capable of displaying content using data and instructions on how to render the data.

The document preparation system 130 includes various engines and/or components configured to manage business intelligence data for an enterprise, such as an extraction engine 150 that extracts data and metadata from business intelligence files stored by the data stores 110, an application engine 160 that generates rendering instructions based on the extracted data and metadata, and a presentation engine 170 that creates or otherwise generates interactive documents based on the extracted data and metadata and the generated rendering instructions, which are displayed to users via the document viewers 140. The document preparation system 130 may be included in a server or service in a BI system, such as the SAP BusinessObjects BI Platform.

Therefore, in some example embodiments, the document preparation system 130 includes components configured to extract data and metadata from various different formats of data files and generate interactive documents presentable by various different types of document viewers, among other things.

Figure 2:
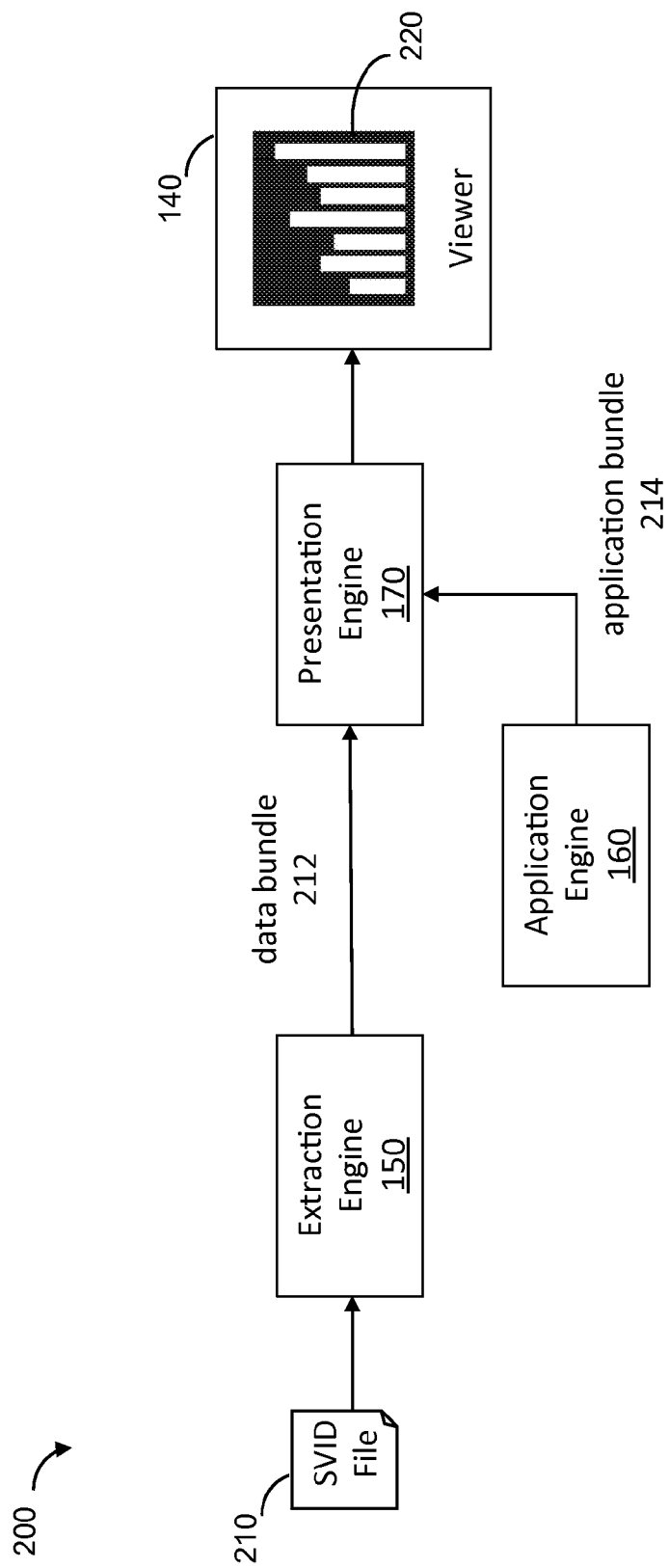
FIG. 2 is a block diagram illustrating the flow of information in a document preparation system, in some example embodiments.

For example, FIG. 2 is a block diagram 200 illustrating the flow of information in a document preparation system, in some example embodiments. The extraction engine 150 extracts data and metadata from a business intelligence data file 210, such as an SVID file. The extraction engine 150 converts the extracted data into a format suitable for consumption by the presentation engine 170, and creates a data bundle 212 that includes the convened data files. The application engine 160 receives the data and metadata (or, information identifying the format of the data and metadata), and creates an application bundle 214 that includes rendering instructions associated with the data and metadata. The presentation engine 170 receives the two bundles, and creates an encoded bundle including the data bundle 212, the application bundle 214, and associated rendering instructions. The encoded bundle is embedded into the document viewer 140, which displays an interactive document 220 using the embedded bundle of data and rendering instructions.

Example of Extracting Data and Metadata From Business Intelligence Files

Figure 3:
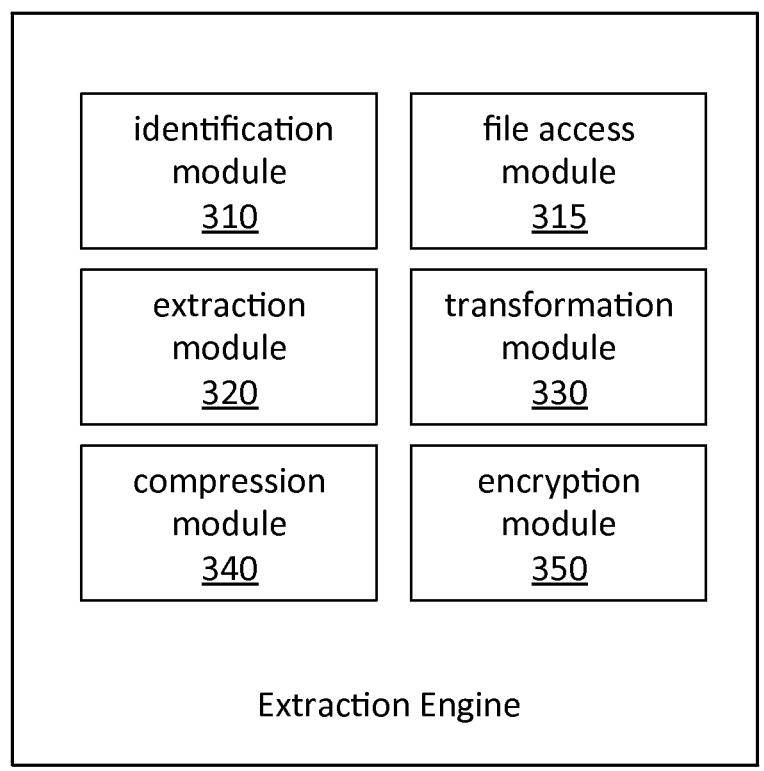
FIG. 3 is a block diagram illustrating components of an extraction engine, in some example embodiments.

As described herein, in some example embodiments, the systems and methods described herein may extract data from a business intelligence file, such as an SAP Visual Intelligence Document file (SVID file,) and convert, compress, and/or package the data into a data bundle that includes a data file format and a metadata file format that is supported by a document viewer. FIG. 3 is a block diagram illustrating components of an extraction engine 150, in some example embodiments.

The extraction engine 150 may include an identification module 310 configured and/or programmed to identity data and metadata within the business intelligence file. For example, the identification module 310 may search or scan within files of a data store, such as files having an unknown format, for data files and/or metadata files, and based on the content of the files or the format of the files, identify one or more files as data files (e.g. data streams) or metadata files.

The extraction engine 150 may include a file access module 315 that is configured and/or programmed to accesses a file of business intelligence data. For example, the file access module 315 may uncompress a BI data file, such as a VID file (e.g., SVID file) in order to gain access to the contents of the BI data file, such as data files (data stream files, spreadsheet files, and so on) and/or metadata files (e.g., files in an Extensible Markup Language (XML) format).

The extraction engine 150 may include a extraction module 320 configured and/or programmed to extract data and metadata from the business intelligence files, such as data or metadata from files identified by the identification module 310. The extraction module 320 may include libraries or Application Programming Interfaces (APIs) configured to uncompress any compressed files (e.g., binary SVID files), and extract metadata by parsing Extensible Markup Language (XML) documents or other similar documents and extract data by copying a data stream from the business intelligence files. Thus, the extraction module 320 may include or access various extraction tools, such as XML parsers (e.g., the Streaming API for XML (StAX) parser, a Document Object Model (DOM) parser) and data transfer components, among other things. For example the StAX parser is a hybrid event and the DOM parser may be suitable for data sets of various sizes, such as smaller data sets.

The extraction engine 150 may include a transformation module 330 configured and/or programmed to convex or otherwise transform the extracted data and metadata into a format associated with certain specifications or formats supported by other components within the system, such as document viewers 140, the presentation engine 170, and so on. For example, the transformation module 330 may convert the extracted metadata into a JavaScript Object Notation (JSON) or other data interchange format that may be based on a certain business intelligence specification or format, and convert the copied data stream into a comma-separated values (CSV) format or other plain text format that may be based on a certain business intelligence specification or format.

The extinction engine 150 may also include a compression module 340 configured and/or programmed to compress the files of converted data and metadata into a data bundle, and an encryption module 350 configured and/or programmed to encrypt the compressed data bundle. For example, the encryption module 350 may encrypt the data bundle with a password attributed to and/or associated with a user that is creating the interactive document.

Figure 4:
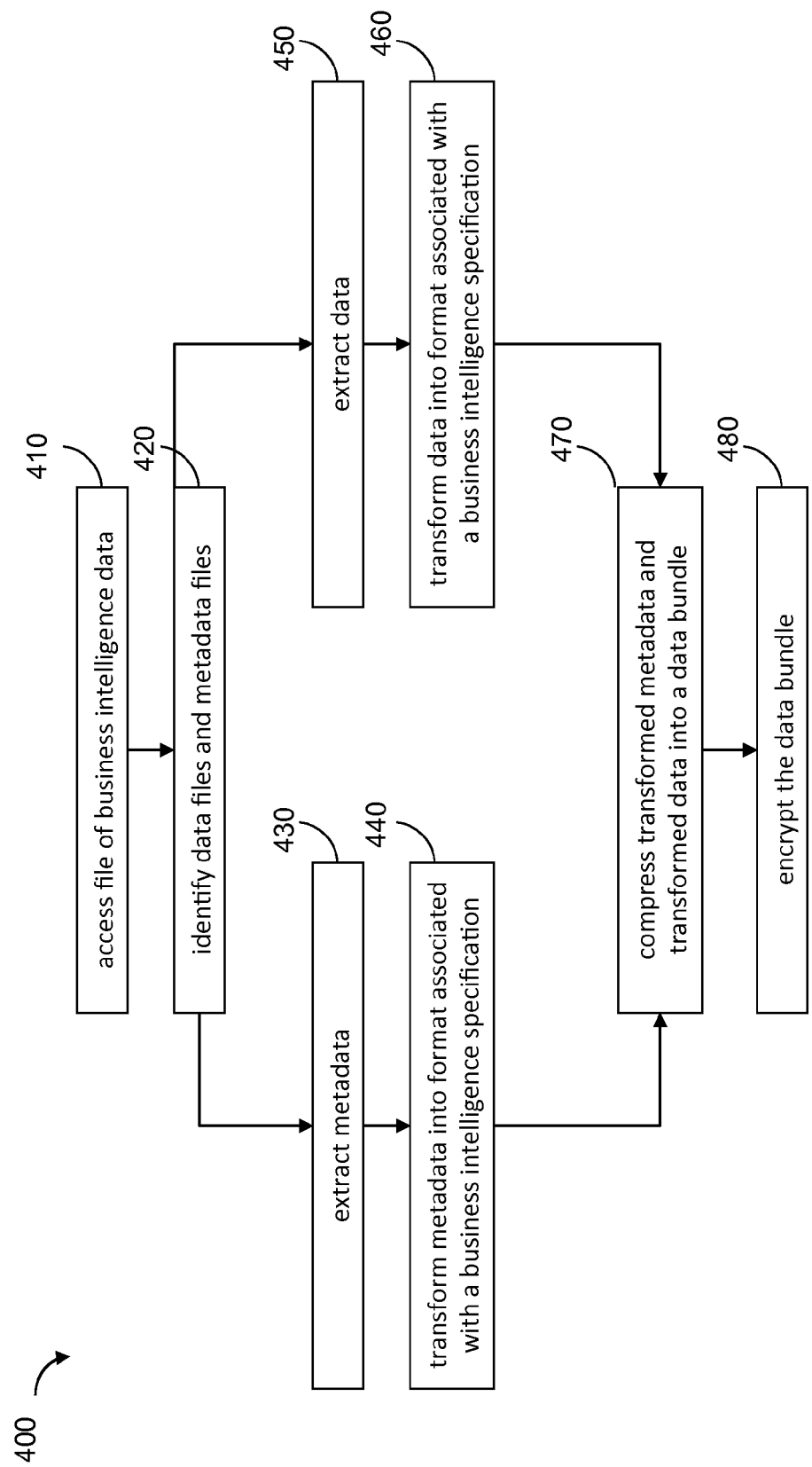
FIG. 4 is a flow diagram illustrating a method for generating a data bundle, in some example embodiments.

Thus, before or after compression and encryption, the extraction engine 150 may generate a data bundle, such as a data bundle binary archive, in a lightweight format that may be password protected and consumable by various different components or applications (e.g., browsers and other document viewers) that support business intelligence document specifications, among other things. FIG. 4 is a flow diagram illustrating a method 400 for generating a data bundle, in some example embodiments. The method 400 may be performed by the extraction engine 150 and, accordingly, is described herein merely by way of reference thereto. It will be appreciated that the method 400 may be performed on any suitable hardware.

In operation 410, the extraction engine 150 accesses a file of business intelligence data. For example, the file access module 315 may uncompress a BI data file, such as an SVID file in order to gain access to the contents of the BI data file.

In operation 420, the extraction engine 150 identifies data files and metadata files within the accessed file. For example, the identification module 310 identifies various data files, such as files that include data tables, and identifies various metadata files, such as XML documents.

In operation 430, the extraction engine 150 extracts the metadata from the identified metadata files. For example, the extraction module 320 extracts the metadata using a parser, such as an XML parser. In operation 440, the extraction engine 150 transforms and/or converts the extracted metadata into a format associated with a business intelligence specification, such as a specification associated with BI documents and components configured to display interactive documents. For example, the transformation module 330 converts the extracted metadata from a first, specific format (e.g., XML) into another format (e.g., JSON) consumable by document viewers and other components.

In operation 450, the extraction engine 150 extracts the data from the identified data files. For example, the extraction module 320 extracts the data by copying the data from a data stream file. In operation 460, the extraction engine 150 transforms and/or converts the extracted data into a format associated with a business intelligence specification, such as a specification associated with BI documents and components configured to display interactive documents. For example, the transformation module 330 converts the extracted data into a CSV format or other consumable format.

In operation 470, the extraction engine 150 compresses the transformed data and the transformed metadata into a data bundle. For example, the compression module 340 creates a compressed data bundle (e.g., data.bundle, binary data file, and so on) of the metadata in the JSON format and the data in the CSV format.

In operation 480, the extraction engine 150 encrypts the data bundle. For example, the encryption module 350 encrypts the compressed data bundle using a password or other security measure, such as a password attributed to and/or supplied by a user that is associated with the file of business intelligence data and/or that is creating the data bundle. In some example embodiments, the encryption is a symmetric encryption scheme, such as the Advanced Encryption Standard.

Figure 5:
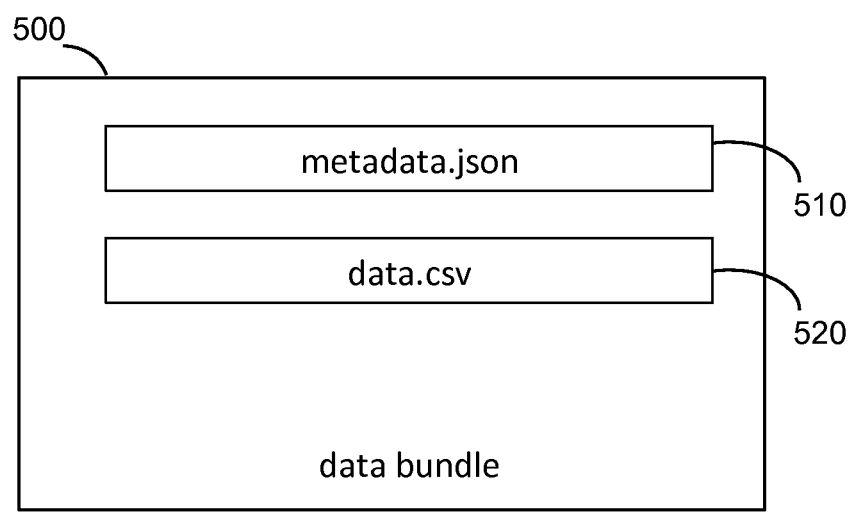
FIG. 5 is a block diagram illustrating an example data bundle created from a business intelligence file, in some example embodiments.

FIG. 5 illustrates an example data bundle 500 created from a BI file, in some example embodiments. The data bundle 500 includes various contents, such as one or more converted metadata files 510 ("metadata.json"), and one or more converted data files 520 ("data.csv").

Thus, in some example embodiments, the system extracts data and metadata from BI documents, such as SAP Visual Intelligence Documents, and creates consumable data bundles with the extracted data and metadata. For example, the system may provide a web-based application that leverages various APIs and/or libraries in order to extract the data and metadata, such as an application that includes a user interface configured to receive documents and files (e.g., a user drags and drops files into the UI) and convert the documents and files into the compressed, encrypted, consumable data bundles described herein.

Example of Generating Rendering Instructions Based on Extracted Data

Figure 6:
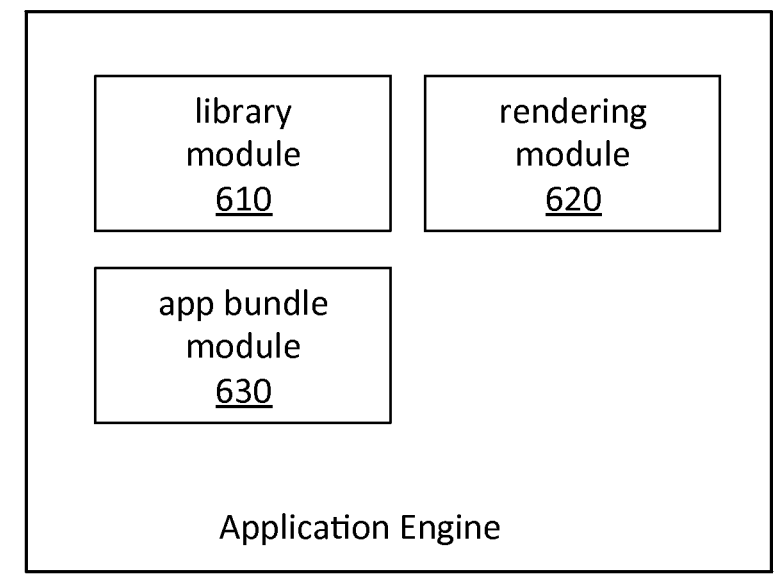
FIG. 6 is a block diagram illustrating components of an application engine, in some example embodiments.

As described herein, in some example embodiments, the systems and methods described herein may generate rendering instructions to be utilized in presenting interactive BI documents, and create an application bundle that is based on an associated data bundle, among other things. FIG. 6 is a block diagram illustrating components of the application engine 160, in some example embodiments.

The application engine 160 may include a library module 610 that is configured and/or programmed to identify, determine, and/or select a data library in which to generate rendering instructions. For example, the library module 610 may automatically select one or mare charting libraries (e.g., D3.js, Raphaël, jqPlot, ProtoVis, or another JavaScript library), may provide a user interface that enables a user to select a charting library, and so on.

The application engine 160 may include a rendering module 620 that is configured and/or programmed to generate rendering files using the selected library and based on the extracted metadata. For example, the rendering module 620 may generate an HTML markup file, a CSS stylesheet, and JavaScript code using a selected library, and based on receiving information identifying the format of the converted metadata within the data bundle is a JSON format.

The application engine 160 may include an application bundle module 630 that is configured and/or programmed to create an application bundle with contents that include the files generated by the rendering module 620. For example, the application bundle module 630 may compress the generated HTML markup file, the CSS stylesheet, and the JavaScript code into a compressed binary bundle, such as an app.bundle archive.

Figure 7:
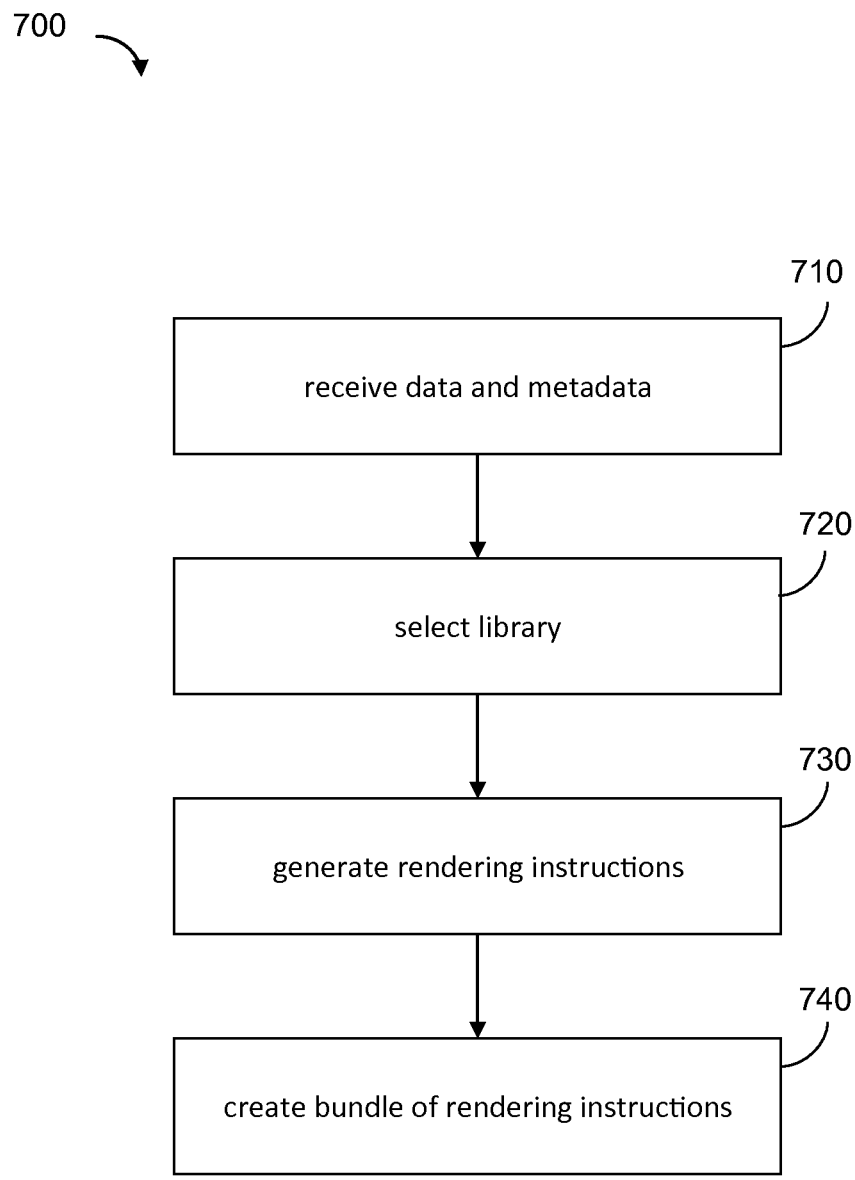
FIG. 7 is a flow diagram illustrating a method for generating an application bundle, in some example embodiments.

FIG. 7 is a flow diagram illustrating a method 700 for generating an application bundle, in some example embodiments. The method 700 may be performed by the application engine 160 and, accordingly, is described herein merely by way of reference thereto. It will be appreciated that the method 700 may be performed on any suitable hardware.

In operation 710, the application engine 160 receives information associated with the data and metadata within a generated data bundle. For example, the system receives information identifying the format of the metadata and/or the format of the data within the data bundle.

In operation 720, the application engine 160 selects a charting library. For example, the library module 610 selects a charting library to be used in generating rendering instructions. In operation 730, the application engine 160 generates rendering instructions. For example, the rendering module file 620 uses the selected library and the information identifying the format of the metadata to generate rendering instructions (e.g., HTML markup files, CSS stylesheets, JavaScript code, and so on).

In operation 740, the application engine 160 creates a bundle of rendering instructions. For example, the application bundle module 630 compresses the different files of the rendering instructions into a binary app.bundle file, which includes files that match the format of the metadata within the data bundle.

Figure 8:
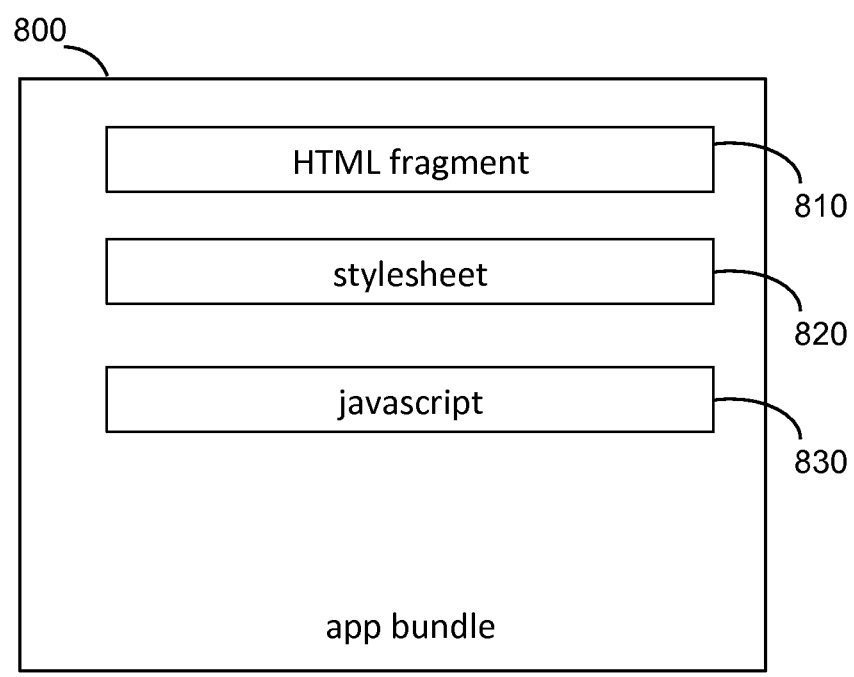
FIG. 8 is a block diagram illustrating an example application bundle, in some example embodiments.

FIG. 8 is a block diagram illustrating an example application bundle 800, in some example embodiments. The application bundle 800 includes various contents, such as HTML fragments 810, stylesheets 820, JavaScript code 830 that matches the format of the metadata within the data bundle, and so on.

Figure 9:
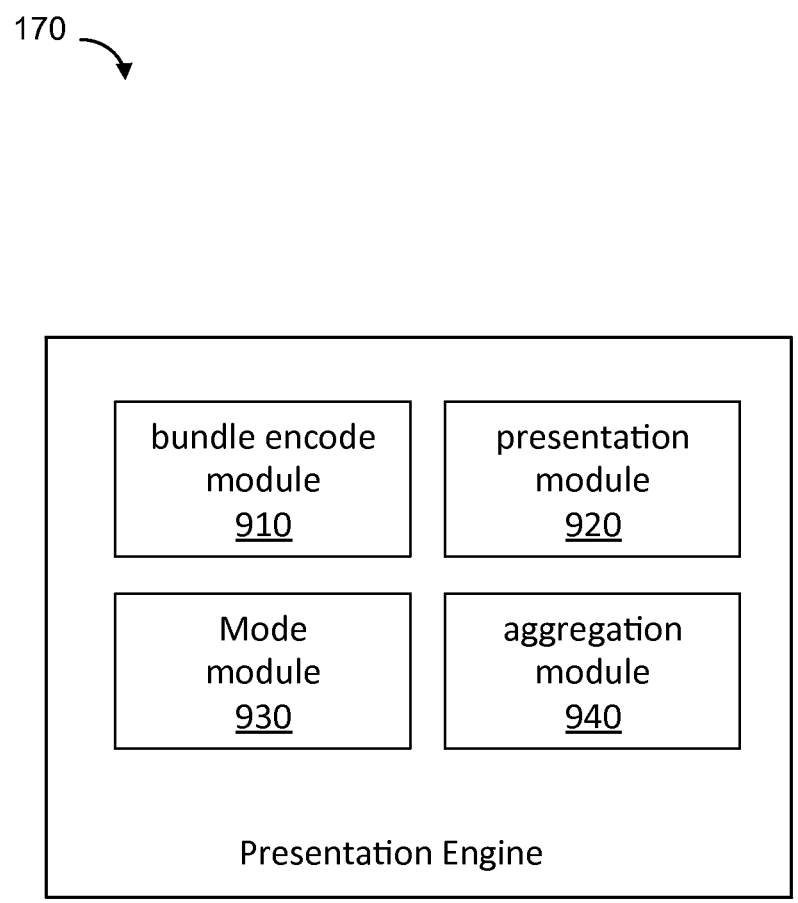
FIG. 9 is a block diagram illustrating components of a presentation engine, in some example embodiments.

Thus, by creating application bundles along with the data bundles described herein, the system, in some example embodiments, provides bundles of data and rendering instructions for visual, interactive documents, which enables the packaging and sharing of these interactive documents in various use scenarios, such as when a user is offline and presenting the interactive documents, among other benefits.
Example Presenting of Interactive Documents As described herein, in some example embodiments, the systems and methods described herein may generate an interactive document, such as a BI or visual intelligence document (e.g., interactive chart or graph), using BI data packages, such as the data bundles and the application bundles described herein. FIG. 9 is a block diagram illustrating components of a presentation engine 170, in some example embodiments.

The presentation engine 170 may include a bundle encode module 910 configured and/or programmed to encode a data bundle and/or application bundle. For example, the bundle encode module may apply Base64 encoding to convert the bundles, which may be in a binary format, into textual representations. The system may encode the bundles in various cases, for example, when a document viewer protocol is configured to display certain formats (e.g., an email application that displays ASCII-printable characters).

The presentation engine 170 may include a presentation module 920 that is configured and/or programmed to embed the encoded data bundle and encoded application bundle into a document viewer, for presentation of an interactive document via the document viewer 140.

As described herein, the document viewer 140 may include a variety of different components (e.g., browsers, transcoders, and so on) capable of displaying interactive documents, such as displaying interactive documents as single-page web-based applications. Thus, in some example embodiments, the system may generate data bundles and/or application bundles based on specifications and/or formats supported by a target document viewer 140.

However, in some example embodiments, the document viewer 140 may include various components configured to display interactive documents derived from data bundles and application bundles. To that end, the presentation endue 170 and its components (e.g., the bundle encode module 910 and/or the presentation module 920) may be contained in or be part of a stand-alone document viewer, among other things.

For example, the system may provide a generic document viewer (e.g., HTML5-based) that is configured to receive data bundles and application bundles in a variety of different formats, combine the data bundle with the application bundle (optionally caching any combined data), and present BI data as single-page interactive documents, among other things.

The presentation engine 170 may include various modules configured to enable a document viewer to display BI documents from data and application bundles, such as modules that enable the document viewer to provide interactive documents while offline, modules that enable the document viewer to update and/or retrieve additional data not located within the data bundles, and so on.

The presentation engine 170 may include a mode module 930 configured and/or programmed to switch a document viewer from an online mode to an offline module, and vice versa. For example, the mode module 930 may switch the document viewer into an online mode, which allows the viewer to retrieve data from various sources (e.g., cloud data stores) over a network, such as data sources that are identified in the metadata of the data bundle. The document viewer, therefore, may operate in offline mode when the data contained within the data bundle is utilized in presenting visualized BI data, and operate in online mode when additional data not contained within the data bundle is requested, such as when updated data is requested during presentation of visual information.

The presentation engine 170 may include an aggregation module 940 configured and/or programmed to perform aggregation queries within various data sets, enabling the document viewer to receive user queries into the data of a data bundle and provide results of the queries. The aggregation module 940 may include an in-viewer column-oriented database engine, such as a JavaScript implemented database engine, to support such aggregation queries. Example database engines or libraries include Datavore, CrossFilter, and others.

The document viewer may provide other modules and/or functions. For example, the viewer may provide functionality that enables a user to save or store a presented document in a certain state, such as via an API that enables the viewer to access a persistence layer from the application bundle, and later load the presented document in the previous state, if requested.

Figure 10:
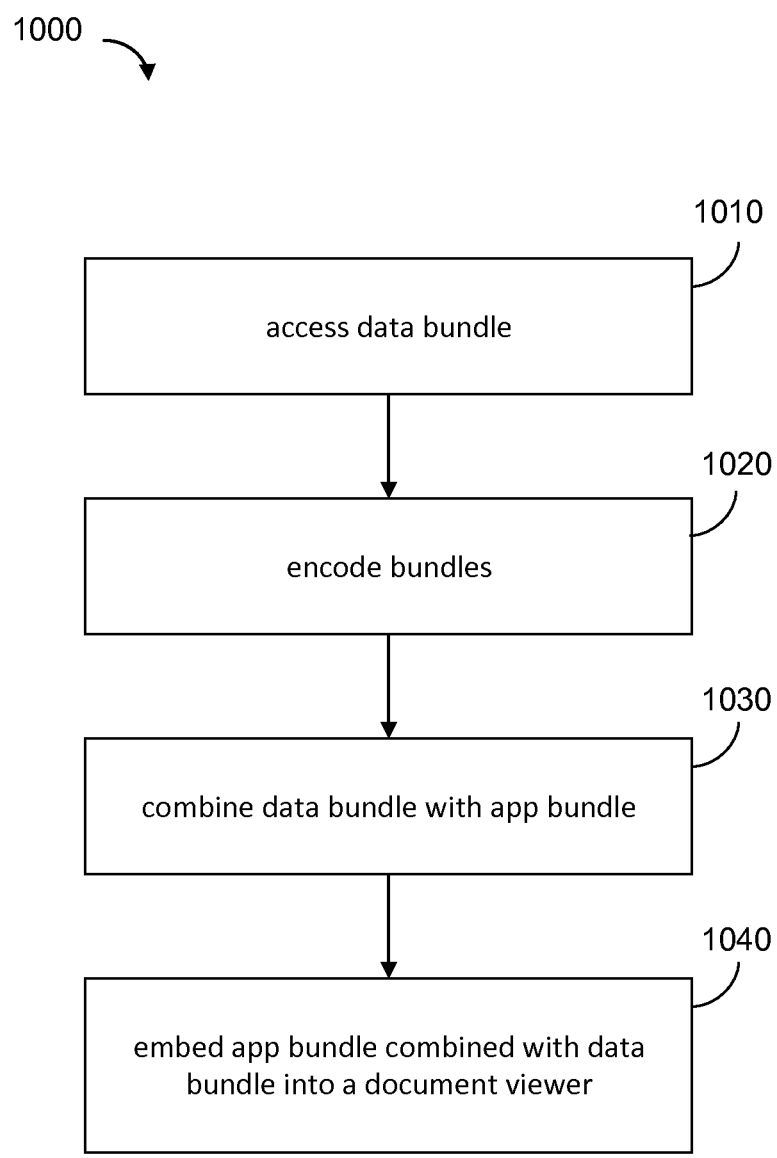
FIG. 10 is a flow diagram illustrating a method for generating an interactive document, in some example embodiments.

Thus, the system may utilize a stand-alone, bundle specific document viewer that includes some or all modules of the presentation engine 170, or interact with a browser or other document viewer via the presentation engine 170, among other things. FIG. 10 is a flow diagram illustrating a method 1000 for generating an interactive document, in some example embodiments. The method 1000 may be performed by the presentation engine 170 and, accordingly, is described herein merely by way of reference thereto. It will be appreciated that the method 1000 may be performed on any suitable hardware.

In operation 1010, the presentation engine 170 accesses a data bundle and an application bundle. For example, a stand-alone document viewer accesses a data bundle and an application bundle. In operation 1020, the presentation engine 170 encodes the bundles. For example, the bundle encode module 910 applies Base64 encoding to convert the data bundle and the metadata bundle from a binary format to a textual format.

In operation 1030, the presentation engine 170 combines the data bundle and the application bundle. For example the presentation module 920 combines or otherwise embeds the data and metadata from the data bundle with the rendering instructions. In operation 1040, the presentation engine 170 embeds the rendering instructions into the document viewer 140 in order to generate an interactive document to be displayed by the document viewer. For example, the presentation module 920 embeds the rendering instructions into the document viewer 140, which may then display the interactive document based on the embedded rendering instructions and data combined with the rendering instructions.

Figure 11:
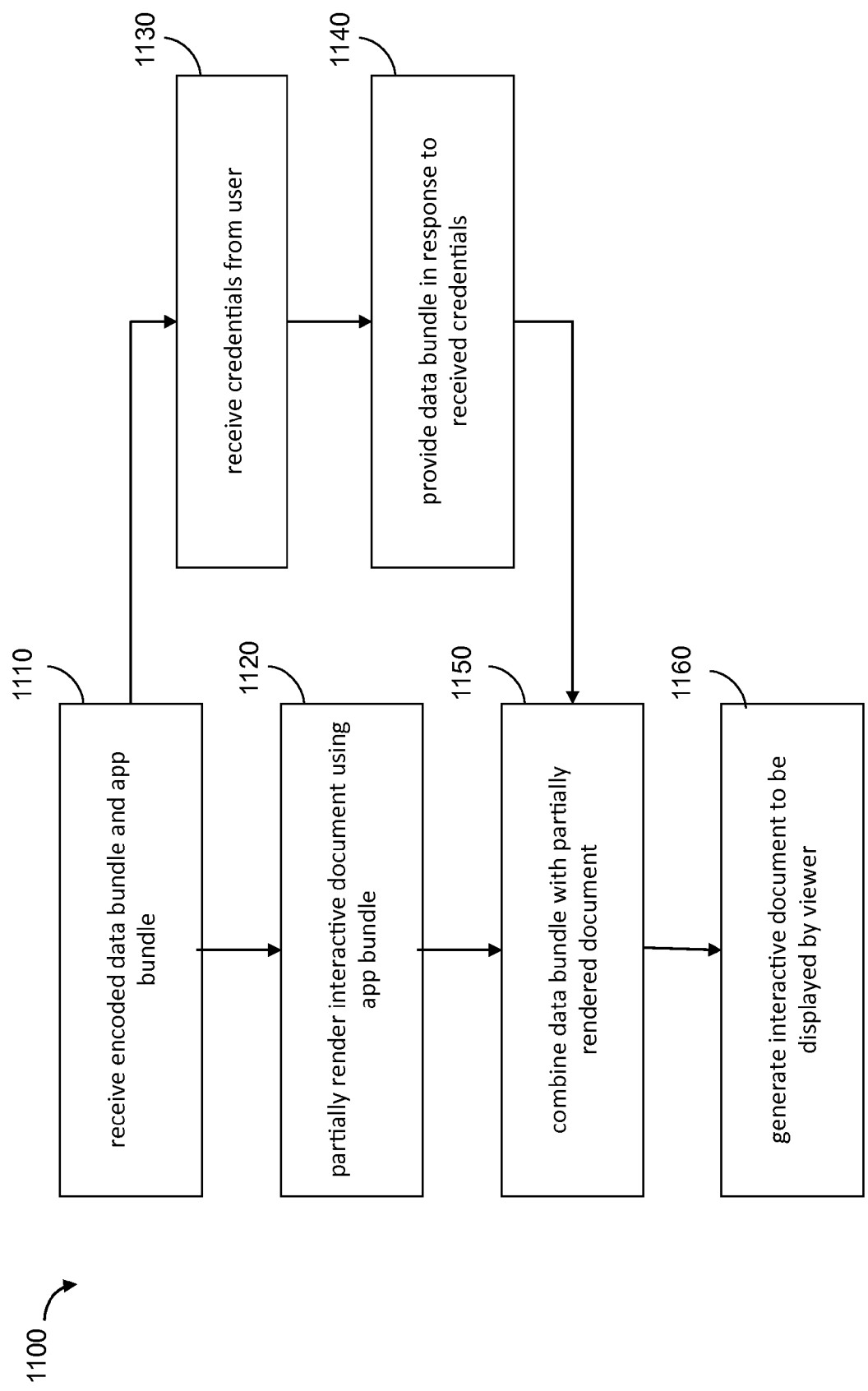
FIG. 11 is a flow diagram illustrating a method for generating an interactive document based on a partially rendered document, in some example embodiments.

As described herein, in some example embodiments, the system protects the business intelligence data by encrypting the data bundle with a password, such as a user-supplied password. When generating documents, the system may partially render a document using the rendering instructions provided by the application bundle, and fully render the document using data from the data bundle after a password is provided by a user. FIG. 11 is a flow diagram illustrating a method 1100 for generating an interactive document based on a partially rendered document, in some example embodiments. The method 1100 may be performed by the presentation engine 170 and, accordingly, is described herein merely by way of reference thereto. It will be appreciated that the method 1100 may be performed on any suitable hardware.

In operation 1110, the viewer 140 receives an encoded data bundle and application bundle with associated rendering instructions. In operation 1120, the viewer 140 partially renders an interactive document using rendering instructions provided by the application bundle. In parallel, the viewer 140, in operation 1130, requests and receives credentials from a user, such as the password used to encrypt the data bundle. In response to receiving the password, the viewer 140, in operation 1140, decrypts and provides the data bundle.

In operation 1150, the viewer 140 combines the decrypted data bundle with the application bundle, and in operation 1160, generates an interactive document to be displaced via a document viewer. Thus, in order to display a document immediately or soon after receiving a password that secures a document, the system partially renders the document using the rendering instructions before or while a password is being requested and/or received, and combines data with the partially rendered document in response to receiving a password that authorizes a user to display the document.

Figure 12:
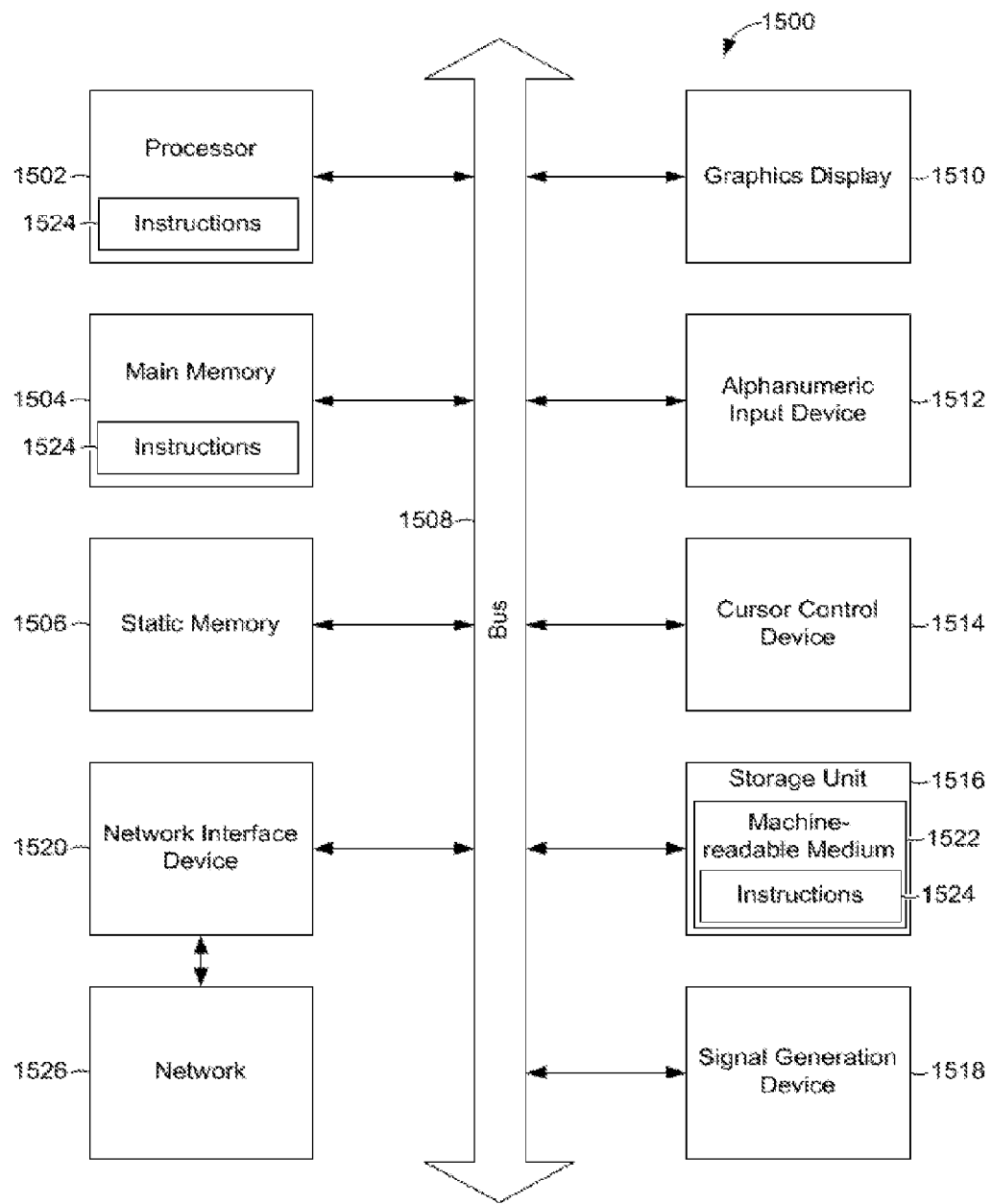
FIG. 12 is a block diagram illustrating components of a machine, according to some example embodiments, able to read instructions from a machine-readable medium and perform any one or more of the methodologies discussed herein.

FIG. 12 is a block diagram illustrating components of a machine 1500, according to some example embodiments, able to read instructions from a machine-readable medium (e.g., a machine-readable storage medium) and perform any one or more of the methodologies discussed herein, in whole or in part. Specifically, FIG. 12 shows a diagrammatic representation of the machine 1500 in the example form of a computer system and within which instructions 1524 (e.g., software, a program, an application, an applet, an app, or other executable code) for causing the machine 1500 to perform any one or more of the methodologies discussed herein may be executed. In alternative embodiments, the machine 1500 operates as a stand-alone device or may be connected (e.g., networked) to other machines. In a networked deployment, the machine 1500 may operate in the capacity of a server machine or a client machine in a server-client network environment, or as a peer machine in a peer-to-peer (or distributed) network environment. The machine 1500 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1524, sequentially or otherwise, that specify actions to be taken by that machine. Further, while only a single machine is illustrated, the term "machine" shall also be taken to include a collection of machines that individuals or jointly execute the instructions 1524 to perform any one or more of the methodologies discussed herein.

The machine 1500 includes a processor 1502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1504, and a static memory 1506, which are configured to communicate with each other via a bus 1508. The machine 1500 may further include a graphics display 1510 (e.g., a plasma display panel (PDP), a light emitting diode (LED) display, a liquid crystal display (LCD), a projector, or a cathode ray tube (CRT)). The machine 1500 may also include an alphanumeric input device 1512 (e.g., a keyboard), a cursor control device 1514 (e.g., a mouse, a touchpad, a trackball, a joystick, a motion sensor, or other pointing instrument), a storage unit 1516, a signal generation device 1518 (e.g., a speaker), and a network interface device 1520.

The storage unit 1516 includes a machine-readable medium 1522 on which is stored the instructions 1524 embodying any one or more of the methodologies or functions described herein. The instructions 1524 may also reside, completely or at least partially, within the main memory 1504, within the processor 1502 (e.g., within the processor's cache memory), or both, during execution thereof by the machine 1500. Accordingly, the main memory 1504 and the processor 1502 may be considered as machine-readable media. The instructions 1524 may be transmitted or received over a network 1526 (e.g., network 120) via the network interface device 1520.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1522 or computer-readable medium is shown in an example embodiment to be a single medium, the term "machine-readable medium" or "computer-readable medium" should be taken to include a single medium or multiple media (e.g., a centralized or distributed database, or associated caches and servers) able to store instructions. The term "machine-readable medium" or "computer-readable medium" shall also be taken to include any medium, or combination of multiple media, that is capable of storing instructions for execution by a machine or computer (e.g., machine 1500), such that the instructions, when executed by one or more processors of the machine or computer (e.g., processor 1502), cause the machine or computer to perform any one or more of the methodologies described herein. Accordingly, a "machine-readable medium" refers to a single storage apparatus or device, as well as "cloud-based" storage systems or storage networks that include multiple storage apparatuses or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some example embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

We claim:

1. A method for generating an interactive document from business intelligence data, the method comprising:
   receiving a data bundle, the data bundle comprising extracted data and metadata from a business intelligence file transformed into a format associated with a business intelligence specification;
   receiving an application bundle comprising rendering instructions generated based, in part on a format of the metadata from the data bundle;
   encoding the data bundle and the application bundle to convert the data bundle and the application bundle from a binary format to a textual format;
   embedding the encoded data bundle and application bundle into a document viewer, the document viewer supporting the business intelligence specification;
   generating a visual interactive document derived from the encoded data bundle and application bundle embedded into the document viewer; and
   displaying, by the document viewer, the visual interactive document as a simile-page web-based application.

2. The method of claim 1, wherein the business intelligence file represents a Sap Visual Intelligence Document (SVID) file;
   wherein the format associated with the business intelligence specification of the metadata from the business intelligence file represents a JavaScript Object Notation (JSON) format and the format associated with the business intelligence specification of the data represents a comma-separated value (CSV) format; and
   wherein the rendering instructions includes JavaScript code.

3. The method of claim 1, further comprising extracting the data and the metadata from the business intelligence file by copying a data stream contained within the business intelligence file and extracting the metadata by parsing Extensible Markup Language (XML) documents contained within the business intelligence file.

4. The method of claim 1, further comprising transforming the extracted data and metadata into a format associated with a business intelligence specification by transforming the extracted data into a comma-separated value (CSV) format and transforming the metadata into a JavaScript Object Notation (JSON) format.

5. The method of claim 4, further comprising generating rendering instructions based on the format of the metadata by:
   receiving information identifying the format of the transformed metadata;
   selecting a charting library; and
   generating the rendering instructions using the charting library.

6. The method of claim 5, wherein generating the rendering instructions based on the format of the metadata further comprising:
   generating rendering instructions that includes at least one of Hyper Text Markup Language (HTML) fragments, a cascading style sheet (CSS) stylesheet, and JavaScript.

7. The method of claim 1, wherein generating the visual interactive document derived from the encoded data bundle and application bundle embedded into the document viewer further comprising:
   generating, offline, the visual interactive document derived from the encoded data bundle and application bundle embedded into the document viewer.

8. The method of claim 7, further comprising:
   performing aggregation queries in an offline mode within the extracted data contained by the data bundle.

9. The method of claim 1, wherein generating the visual interactive document derived from the encoded data bundle and application bundle embedded into the document viewer further comprising:
   generating, online, the visual interactive document derived from the encoded data bundle and application bundle embedded into the document viewer and additional data retrieved from at least one source over a network.

10. The method of claim 9, wherein the at least one source is identified in the metadata of the data bundle.

11. The method of claim 1, further comprising:
   receiving, by the document viewer, a user query to aggregate one or more data sets of data from the data bundle; and
   in response to receiving the user query, generating, by an in-viewer column-oriented database engine, results for the user query.

12. The method of claim 1, wherein the document viewer is a stand-alone document viewer.

13. The method of claim 1, wherein the data bundle is password encrypted, further comprising:
   receiving a password used to encrypt the data bundle;
   in response to receiving the password used to encrypt the data bundle, decrypting the data bundle; and
   combining the data bundle with the application bundle.

14. A system comprising:
   a memory device for storing instructions; and
   a processor, which, when executing the instructions for generating an interactive document from business intelligence data, causes the processor to perform operations comprising:
     receiving a data bundle, the data bundle comprising extracted data and metadata from a business intelligence file transformed into a format associated with a business intelligence specification;
     receiving an application bundle comprising rendering instructions generated based, in part, on a format of the metadata from the data bundle;

encoding the data bundle and the application bundle to convert the data bundle and the application bundle from a binary format to a textual format;

embedding the encoded data bundle and application bundle into a document viewer, the document viewer supporting the business intelligence specification;

generating a visual interactive document derived from the encoded data bundle and application bundle embedded into the document viewer; and displaying, by the document viewer, the visual interactive document as a single-page web-based application.

15. The system of claim 14, wherein the processor, when executing the instructions for generating an interactive document from business intelligence data, further performs operations comprising:

generating a compressed and encrypted data bundle that includes the transformed data and metadata;

generating a compressed application bundle that includes the generated rendering instructions; and combining the data bundle with the application bundle to generate the interactive document.

16. The system of claim 14, wherein the operation of generating the visual interactive document derived from the encoded data bundle and application bundle embedded into the document viewer further comprising:

generating, offline, the visual interactive document derived from the encoded data bundle and application bundle embedded into the document viewer.

17. The system of claim 14, wherein the processor when executing the instructions for generating an interactive document from business intelligence data, causes the processor to perform operations further comprising:

performing aggregation queries in an offline mode within the extracted data contained by the data bundle.

18. The system of claim 14, wherein the operation of generating the visual interactive document derived from the encoded data bundle and application bundle embedded into the document viewer further comprising:

generating, online, the visual interactive document derived from the encoded data bundle and application bundle embedded into the document viewer and additional data retrieved from at least one source over a network.

19. The system of claim 14, wherein the processor when executing the instructions for generating an interactive document from business intelligence data, causes the processor to perform operations further comprising:

receiving, by the document viewer, a user query aggregate one or more data sets of data from the data bundle; and in response to receiving the user query, generating, by an in-viewer column-oriented database engine, results for the user query.

20. A non-transitory machine-readable storage medium in communication with at least one processor, the machine-readable storage medium storing instructions for generating an interactive document from business intelligence data which, when executed by the at least one processor, performs operations comprising:

receiving a data bundle, the data bundle comprising extracted data and metadata from a business intelligence file transformed into a format associated with a business intelligence specification;

receiving an application bundle comprising rendering instructions generated based, in part, on a format of the metadata from the data bundle;

encoding the data bundle and the application bundle to convert the data bundle and the application bundle from a binary format to a textual format;

embedding the encoded data bundle and application bundle into a document viewer, the document viewer supporting the business intelligence specification;

generating a visual interactive document derived from the encoded data bundle and application bundle embedded into the document viewer; and displaying, by the document viewer, the visual interactive document as a single-page web-based application.

* * * * *